United States Patent [19]

Unger et al.

[11] 4,225,463
[45] Sep. 30, 1980

[54] POROUS CARBON SUPPORT MATERIALS USEFUL IN CHROMATOGRAPHY AND THEIR PREPARATION

[75] Inventors: Klaus Unger; Heinz Gotz, both of Darmstadt, Fed. Rep. of Germany

[73] Assignee: Merck Patent Gesellschaft mit beschränkter Haftung, Darmstadt, Fed. Rep. of Germany

[21] Appl. No.: 5,741

[22] Filed: Jan. 23, 1979

[30] Foreign Application Priority Data

Jan. 23, 1978 [DE] Fed. Rep. of Germany ....... 2802846

[51] Int. Cl.² .............. C01B 31/02; C01B 31/04; C01B 31/08; B01J 21/18
[52] U.S. Cl. .................... 252/445; 210/656; 252/444; 423/448; 423/461
[58] Field of Search .......... 252/444, 445; 423/448, 423/449, 445, 461; 264/29.5, 29.6, 29.1

[56] References Cited

U.S. PATENT DOCUMENTS

| | | | |
|---|---|---|---|
| 2,734,800 | 2/1956 | Brooks | 423/448 |
| 3,869,302 | 3/1975 | Shea et al. | 264/29.1 |
| 4,066,699 | 1/1978 | Suggitt et al. | 252/444 |

*Primary Examiner*—P. E. Konopka
*Attorney, Agent, or Firm*—Millen & White

[57] ABSTRACT

A process for preparing porous carbon support materials comprises treating activated carbon or coke, having a particle size of about 5 to about 50 μm, a specific surface area of about 10 to 1,000 m²/g, a hardness of at least about 95% attrition resistance, with solvent or solvents, and then heat treating the activated carbon or coke at a temperature of about 2,400–3,000° C. under an inert, gas atmosphere; said solvent or solvents affecting the mineral and organic impurities in the activated carbon or coke such that after said subsequent heat treatment, substantially all of said impurities are removed. A hard, mechanically stable, porous carbon support material consisting essentially of highly purified activated carbon, highly purified coke or a mixture thereof, said support material having a carbon content of at least 99%, a specific surface area of about 1 to about 5 m²/g and a particle size of about 5 to about 50 μm, may be prepared in this way.

5 Claims, No Drawings

POROUS CARBON SUPPORT MATERIALS USEFUL IN CHROMATOGRAPHY AND THEIR PREPARATION

BACKGROUND OF THE INVENTION

The present invention relates to porous carbon support materials which are suitable for chromatography, especially high-pressure liquid chromatography (HPLC).

In HPLC, support materials of silica gel are preferably used at present, since these possess both a porous skeletal structure with an adequately large surface area and a mechanical stability which is adequate to enable them to withstand the high pressures of up to several hundreds of bars used in HPLC. In order to obtain the non-polar surface which is absolutely essential for specific separation problems, chemical modification of these silica gels has been employed in order to mask their surfaces with non-polar groups.

Among the disadvantages of these support materials is that masking of the polar groups possibly will not be complete. However, their major drawback is their low stability to aqueous solvent systems, above all those with higher pH values.

It has already been recognized that carbon, especially in the form of graphite, should be a very suitable material for HPLC, at least in respect to its low polarity and high chemical stability. Because of its very low mechanical stability, however, graphite cannot be directly employed as a support material in HPLC.

Experiments to prepare carbon support materials which have adequate mechanical strength have hitherto involved two approaches. On the one hand, attempts have been made to compact carbon blacks which are in the form of loose, mechanically unstable agglomerates of micro-particles. This is done by coating by the deposition of pyrocarbon, which, for example, forms during the pyrolysis of benzene. In a second process, macroporous silica is likewise coated with pyrocarbon by pyrolysis of benzene. However, by means of this pyrocarbon coating, which is identical in both cases, the basic structure of the particular support (the mechanically unstable carbon black agglomerates and the $SiO_2$ which is unstable towards certain solvent systems) can only be coated and not fundamentally changed. In addition, this type of coating process is very expensive and can be carried out only in small batches.

SUMMARY OF THE INVENTION

Accordingly, it is an object of the present invention to provide a porous carbon support material for chromatography, which has a non-polar and satisfactorily large surface area, is mechanically stable, is simple and inexpensive to prepare and is stable toward conventional solvents, e.g., aqueous solvents at higher pH's.

Upon further study of the specification and appended claims, further objects and advantages of this invention will become apparent to those skilled in the art.

These objects have been achieved by providing a process for preparing porous carbon support materials, which comprises treating hard activated carbon or coke, having a particle size of about 5-50 μm, and a specific surface area of about 10–1,000 m$^2$/g, with solvents and then heat treating them at a temperature of about 2,400°–3,000° C. under an inert gas atmosphere.

The present invention also relates to the products which are produced, i.e., the hard, mechanically stable porous carbon support materials based on highly purified activated carbons and/or cokes. These have a carbon content of at least 99%, a specific surface area of about 1 to about 5 m$^2$/g and a particle size of about 5 to about 50 μm.

Moreover, this invention also relates to the use of these carbon support materials in chromatography.

DETAILED DISCUSSION

It has been found, surprisingly, that certain activated carbons and certain cokes are very suitable as starting materials for the preparation of non-polar carbon support materials. The use of these starting materials was not obvious, since activated carbons and cokes as a rule have a carbon content of only about 80 to 90%, and, because they have highly heterogeneous polar surfaces due to the high proportion of foreign substances and impurities which they contain. However, it has been found that these impurities can be selectively removed by a series of process steps and that a non-polar graphitized surface can be obtained. This is accomplished without the particle size of the starting material being changed, the porous skeletal structure being destroyed or significant losses in hardness or mechanical stability having to be accepted. This is all the more astonishing since up to about 20% of the components of the starting material is removed by the process of this invention.

The advantages of the process and products of this application over the state-of-the-art lie, above all, in the fact that the support materials produced by this invention are extremely resistant to pressure. Thus, for example, when the flow characteristics through columns which are filled with the support materials of this invention are examined, a linear dependence of the flow rate (ml/minute) on the pressure up to pressures of 400 bars and above is observed. This shows that the support materials do not exhibit any compressibility whatsoever even under these extreme loads. Such resistance has not been possible hitherto with the carbon support materials of the prior art.

A further advantage lies in their simple and inexpensive preparation from starting materials which are readily accessible in large amounts. This is because such suitable starting materials are, surprisingly, certain cokes and activated carbons. This is surprising inasmuch as activated carbons and cokes are highly heterogeneous substances which, although they consist predominantly of carbon, in addition, however, also contain up to 20% of impurities, such as, for example, silicates, hydrocarbons and/or other organic and mineral impurities. Because of the highly polar surface resulting from these impurities, the cokes and carbons are not suitable as substrates for chromatographic separations.

As is known, cokes are materials which are obtained by heating coal while excluding air. Their preparation, further definition and properties are fully conventional and, for example, are described in Ullmanns Encyklopädie der technischen Chemie, Verlag Chemie, Weinheim-New York, 4. Edition, 1977, Volume 14, Pages 505–568 and references cited therein which is incorporated by reference herein.

Activated carbons also are usually prepared from coal. Activation is effected by processes such as, for example, coking, partial oxidation by heating at low temperatures, treatment with oxidizing gases (such as, for example, $O_2$, $CO_2$ or $H_2O$) or in solution treatment. Further details relating to the preparation of activated carbons are given, for example, in "Activated Carbon", J. S. Mattson and H. B. Mark, Jr., Marcel Dekker, New York, 1971, whose disclosure is incorporated by reference herein for the preparation, further definition and properties of the conventional activated carbons.

Particularly suitable starting materials include cokes and activated carbons which have a low proportion (e.g., less than 50% preferably less than 30%) of micropores (e.g., pore diameters less than 30 Å) and a specific surface area of about 10 to about 1,000 m$^2$/g. Cokes with these characteristics can be prepared by known processes from coal and anthracite coal or can be selected, in accordance with these criteria, from the manifold cokes available. Activated carbons which have these characteristics and also have the necessary hardness are commercially available in some cases, such as, for example, LR coke from Bergbauforschung, Essen, or can be prepared by known processes. Suitable hardnesses of the activated carbons and cokes include values of at least about 95% attrition resistance measured according to DIN 51717.

The starting materials can be ground to small particle sizes without difficulty, and batches with any desired particle size can be obtained by particle size fractionation. Particle sizes of between about 5 $\mu$m and about 50 $\mu$m are preferred, and, preferably, narrow particle size fractions are prepared, for example, of 5 to 10 $\mu$m or of 10 to 20 $\mu$m or of 20 to 30 $\mu$m.

These ground and classified particles do indeed have substantial hardness but are completely unsuitable for chromatographic separations since they still contain all their impurities and therefore have a heterogeneous, polar surface. According to this invention, these impurities can be removed virtually completely by treatment with solvents and subsequent heat treatment at high temperatures.

During the solvent treatment, it is possible both for impurities to be dissolved out (extracted) and for impurities to be chemically converted into soluble and/or volatile compounds, which can then, in turn, be dissolved out or volatilized. The grinding and classification is, therefore, followed by a treatment with aqueous and/or organic solvents. For example, an extraction, over a period of several days, with demineralized water, and a subsequent extraction with acetone or xylene can be carried out.

In principle, suitable solvents include all those which are able to remove from the cokes and activated carbons used as the starting materials, the organic and mineral impurities contained therein. In addition to water, such solvents especially include aqueous acids, for example, hydrochloric acid, sulphuric acid, nitric acid or hydrofluoric acid, and alkalis, for example sodium hydroxide solution, potassium hydroxide solution or ammonia. Typically, the concentrations of such aqueous solvents are 1–5 M.

Constituents which are not soluble in water are best removed with the aid of organic solvents. Organic solvents which can be used include, for example, aromatic and aliphatic hydrocarbons, such as, for example, benzene, toluene, xylene, heptane, hexane, cyclohexane or petroleum ether; esters, such as, for example, ethyl acetate or butyl acetate; ketones, such as, for example, acetone or methyl ethyl ketone; acids, such as, for example, formic acid or acetic acid; bases, such as, for example, pyridine, morpholine or triethylamine; and other organic solvents, such as, for example, carbon disulphide, acetonitrile, dimethylformamide, dimethyl sulphoxide or sulpholane. The solvents and combinations thereof, and the amounts of solvent used are not critical. The solvent which is most advantageous for the particular starting material employed can be determined by simple testing by routine experimentation. In general, total solvent treatment times are 1–100 hours, the solvent optionally being replenished several times, e.g., 1–10 times, and is in each case repeated until the carbon content remains constant.

However, it is particularly advantageous first to boil thoroughly with approximately 20% strength hydrochloric acid and then to evaporate 3 to 5 times with hydrofluoric acid. The carbon content of the materials increases considerably as a result of this treatment, for example from about 80 to about 90%. Despite the greatly increased proportion of carbon, the products are still polar and therefore even in this form are still not suitable for use as a separating material for chromatography.

The material which has been pre-treated with the solvents, obtains its optimum characteristics by means of a subsequent heat treatment, preferably at temperatures between about 2,400° and 3,000° C. As a result of this treatment, in which all of the volatile constituents still present are removed, the carbon content of the products again increases considerably and reaches values of more than 99%, i.e., substantially all of the impurities are removed. Of course, care must be taken that neither oxygen nor other oxidizing gases are present during this treatment. The treatment is therefore carried out in an inert gas atmosphere for example under nitrogen or a rare gas of a pressure of 50–200 mm Hg. Argon is preferred.

The time taken for this treatment depends on the temperature used. At the preferred temperatures of between about 2,400° and about 3,000° C., a time of about 1 to about 2 hours suffices. The total residence time in the furnace depends on how rapidly the prescribed temperature is reached, i.e., on the power of the furnace. The furnaces used will as a rule be electrical furnaces, such as, for example, induction furnaces.

Surprisingly, through all of these treatments, the materials retain their original size and shape predetermined at the beginning of the process by the grinding and classification operations. This is astonishing since, during the process, the material loses up to about 20% of its weight and also the specific surface area decreases from an initial value of 10 to 1,000 m$^2$/g to about 1 to 5 m$^2$/g. The products are very firm. As a result, they are resistant to pressures far above 400 bars, and are virtually free from micropores, which could have an adverse effect on the chromatographic separation process.

The products have a homogeneous and non-polar surface and exhibit a good chromatographic activity towards hydrocarbons dissolved in polar eluants. This also is astonishing, since the products have a specific surface area of only about 1 to 5 m$^2$/g. In contrast, for example, reversed phase support materials based on silica gel have surface areas in the range of 100 to 300 m$^2$/g, and the state of the art carbon black agglomerates still have specific surface areas of 10 to 70 m$^2$/g.

It is also surprising that the capacity factors of nonpolar test substances examined, when using, for example, a methanol/water mixture, rise exponentially as the water content increases, the upward slope of the curves being different for different substances. This means that differences in the selectivity coefficients (i.e., the ratio of the capacity factors of two test substances) can be achieved by simply varying the composition of the eluant, thereby enabling chromatographic separations to take place.

The products of this invention can be characterized not only by their carbon content and specific surface area, but additionally by their specific pore volume, porosity, average pore diameter and helium density.

The pore volumes of the products of this invention are between about 0.05 and about 0.2 ml/g, values of about 0.05 to about 0.1 ml/g being preferred. Porosities of about 10 to 25%, preferably 10 to 15%, result from these pore volumes.

As a result of the heat treatment at high temperatures, the helium density of the products of this invention increases and reaches values which, at about 1.8 to 2.1 g/cm$^3$, are in the vicinity of the density of pure graphite (2.26 g/cm$^3$). The average pore diameter of the products also increases slightly during the preparation procedure and is between about 10 and about 100 Å. The pore diameter of the products of this invention can be varied in a controlled manner by appropriate choice of the starting materials, taking into account the increase which occurs, i.e., about by the factor of 2-4. The average pore diameter of the products is preferably between about 20 and about 50 Å. As a result of this average pore diameter, which is in the region of the so-called mesopores, and the lack of substantial proportions of micropores, the products of this invention possess excellent chromatographic properties.

By means of the present invention it is, therefore, possible to obtain valuable support materials for chromatography from readily accessible and inexpensive starting materials, by means of a process which can also be carried out on an industrial scale. These support materials are distinguished, above all, by their great hardness and resistance to pressure which is associated therewith, and by their total inertness to aqueous solutions, even at pH values above 9. Moreover, by virtue of their homogeneous, non-polar surfaces, they can be used in chromatography to selectively retard and thus separate sample substances.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

These non-limiting examples illustrate the process of this invention and the preparation and use of the products of this invention. In the Examples:

The density was measured with the aid of a model 930 helium pycnometer from Messrs. Beckmann.

The specific surface areas were determined by the BET method (Brunauer, Emmet and Teller, Journal of the American Chemical Society, Volume 60, page 309, 1938) using nitrogen as the adsorbate, and the pore volume was determined by the method of L. Gurwitsch, described in Journal of the Physical Chemical Society, Volume 47, page 805, 1915.

The average pore diameter is obtained from the maximum of the differential pore volume distribution (C. Pierce, Journal of Physical Chemistry, Volume 57, page 149, 1953).

The porosity P can be calculated from the helium density ($\rho w$) and the apparent density ($\rho s$) in accordance with the equation $$P = (1 - \frac{\rho_s}{\rho_w}) \cdot 100\ [\%].$$

EXAMPLES OF THE PREPARATION OF THE SUPPORT MATERIALS OF THIS INVENTION

EXAMPLE I

Support No. 1

By grinding and subsequent fractionation, 36 g of a fraction with a particle size in the range from 7 to 13 μm were obtained from a coal coke of the following properties:

| | |
|---|---|
| Carbon content | 81.8% |
| Hydrogen content | 1.1% |
| Nitrogen content | 0.15% |
| Residue | 10.9% |
| Specific surface area S according to BET | 64 m$^2$/g |
| Porosity P | 36.4% |

This fraction was boiled thoroughly for 72 hours in 600 g of 20% strength aqueous hydrochloric acid solution, the hydrochloric acid solution being replenished several times. After drying at 200° C., the material was evaporated to dryness three times with 50 g of concentrated aqueous hydrofluoric acid solution. It was then washed with hot 0.1 normal sodium hydroxide solution. The analysis of the material prepared in this way gave the following values:

| | |
|---|---|
| Carbon content | 90.6% |
| Hydrogen content | 0.93% |
| Nitrogen content | 1.40% |
| Ash content | 3.80% |
| Specific surface area S according to BET | 37 m$^2$/g |
| Specific pore volume Vp | 0.08 ml/g |
| Porosity P | 12.2% |
| Average pore diameter D | 36 Å |
| Helium density | 1.79 g/ml |

The product was then subjected to a heat treatment at 2,800° C. under an argon pressure of 100 mm Hg for 2 hours. The analysis of the end product (Support No. 1) gave the following values:

| | |
|---|---|
| Carbon content | 99.5% |
| Hydrogen content | 0.11% |
| Nitrogen content | 0% |
| Ash content | 0% |
| Specific surface area S according to BET | 2.3 m$^2$/g |
| Specific pore volume Vp | 0.06 ml/g |
| Porosity P | 11.2% |
| Average pore diameter D | 30 Å |
| Helium density | 2.10 g/ml |

EXAMPLE II

Support No. 2

A fraction having a particle size of 5 to 23 μm was obtained from the starting material used in Example 1 by grinding and sedimentation in isopropanol. This material was treated in the manner described in Example 1. The analysis of the end product (Support No. 2) gave:

| | |
|---|---|
| Carbon content | 99.3% |
| Hydrogen content | 0.23% |
| Nitrogen content | 0% |
| Ash content | 0% |
| Specific surface area S according to BET | 3.0 m²/g |
| Specific pore volume Vp | 0.08 ml/g |
| Porosity P | 14.4% |
| Average pore diameter D | 45 Å |
| Helium density | 2.11 g/ml |

EXAMPLE III

Support No. 3

The procedure used in Example II was followed except that the heat treatment was not carried out at 2,800° C. but rather at 2,400° C. for 2 hours. The analysis of the end product (Support No. 3) gave:

| | |
|---|---|
| Carbon content | 99.7% |
| Hydrogen content | 0.31% |
| Nitrogen content | 0% |
| Ash content | 0% |
| Specific surface area S according to BET | 1.44 m²/g |
| Specific pore volume Vp | 0.05 ml/g |
| Porosity P | 9.3% |
| Average pore diameter D | 40 Å |
| Helium density | 2.06 ml/g |

EXAMPLE IV

Support No. 4

An activated carbon, prepared from coal by steam activation, having an average particle size of 5 to 23 μm and having properties given by the following analytical data:

| | |
|---|---|
| Carbon content | 90.2% |
| Hydrogen content | 0.64% |
| Nitrogen content | 0.05% |
| Ash content | 3.3% |
| Specific surface area S according to BET | 645 m²/g |
| Specific pore volume Vp | 0.94 ml/g |
| Porosity P | 65% |
| Average pore diameter D | 21 Å |
| Helium density | 2.11 g/ml |

Was treated in the manner described in Example I. A product (Support No. 4) with the following properties was obtained:

| | |
|---|---|
| Carbon content | 99.6% |
| Hydrogen content | 0.39% |
| Nitrogen content | 0% |
| Ash content | 0.2% |
| Specific surface area S according to BET | 3.18 m²/g |
| Specific pore volume Vp | 0.17 ml/g |
| Porosity P | 23.8% |
| Average pore diameter | 39 Å |
| Helium density | 1.84 q/ml. |

EXAMPLES OF THE USE OF THE SUPPORT MATERIALS OF THIS INVENTION

EXAMPLE V

A separation of homologous benzene derivatives was carried out in less than 6 minutes in a column packed with support No. 1 (Example I).

Conditions:

| | |
|---|---|
| Eluant | methanol/water, 55/45 parts by volume |
| Column | length = 25 cm; internal diameter = 4 mm |
| Linear eluant velocity | 2.60 mm/second |
| Pressure | 300 bars |
| Detector | UV 254 nm |

The components and their retention times were:

| | |
|---|---|
| Benzene | 2.35 minutes |
| Toluene | 2.83 minutes |
| Ethylbenzene | 3.41 minutes |
| Isopropylbenzene | 3.84 minutes |
| Tert-butylbenzene | 4.51 minutes |
| 1-methylstyrene | 5.14 minutes |

EXAMPLE VI

A separation of naphthalene derivatives was carried out in less than 8 minutes in a column packed with support No. 3 (Example III).

Conditions:

| | |
|---|---|
| Eluant | methanol/water, 55/45 parts by volume |
| Column | length = 25 cm; internal diameter = 4 mm |
| Linear eluant velocity | 5.20 mm/second |
| Pressure | 159 bars |
| Detector | UV 254 nm |

The components and their retention times were:

| | |
|---|---|
| Benzene | 0.82 minute |
| 1-Naphthol | 0.98 minute |
| Naphthalene | 1.26 minutes |
| 1-methylnaphthalene | 2.18 minutes |
| 1-bromonaphthalene | 3.74 minutes |
| 2,3-dimethylnaphthalene | 7.27 minutes |

EXAMPLE VII

A separation of phthalic acid esters (plasticizers) was carried out in 6 minutes in a column packed with support No. 1.

Conditions:

| | |
|---|---|
| Eluant | methanol/water, 80/20 parts by volume |
| Column | length = 25 cm; internal diameter = 4 mm |
| Linear eluant velocity | 4.39 mm/second |
| Detector | UV 254 nm |

The components and their retention times were:

| | |
|---|---|
| Dimethyl phthalate | 1.18 minutes |
| Diallyl phthalate | 1.48 minutes |
| Dibutyl phthalate | 2.51 minutes |
| Dicyclohexyl phthalate | 3.71 minutes |

| | |
|---|---|
| Bis-butylglycol phthalate | 4.18 minutes |
| Benzyl butyl phthalate | 5.70 minutes |

EXAMPLE VIII

A separation of pharmaceutically active substances was carried out in less than 6 minutes in a column packed with support No. 1.

Conditions:

| | |
|---|---|
| Eluant | methanol/water, 80/20 parts by volume adjusted to a pH of 11.22 with 2.0 mmols/l of $Na_2CO_3$ and 0.2 mmol/l of $H_3BO_3$ |
| Column | length - 25 cm; internal diameter - 4.0 mm |
| Linear eluant velocity | 3.53 mm/second |
| Pressure | 300 bars |
| Detector | UV 254 nm |

The components and their retention times were:

| | |
|---|---|
| Codeine | 1.48 minutes |
| Diazepoxide | 1.72 minutes |
| Anaesthesin | 2.07 minutes |
| Theobromine | 2.65 minutes |
| Strychnine | 3.68 minutes |
| Coffeine | 5.45 minutes |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and moficiations of the invention to adapt it to various usages and conditions.

What is claimed is:

1. A process for preparing porous carbon support materials useful in chromatography, which comprises treating activated carbon or coke, having a particle size of about 5 to about 50 $\mu$m, a specific surface area of about 10 to about 1,000 $m^2/g$, and a hardness of at least about 95% attrition resistance, with a solvent or solvents, and then heat treating the activated carbon or coke at a temperature of about 2,400°–3,000° C. under an inert, gas atmosphere; said solvent or solvents affecting the mineral and/or organic impurities in the activated carbon or coke, such that, after said subsequent heat treatment, substantially all of said impurities are removed.

2. The process of claim 1, wherein the solvent treatment comprises extracting the activated carbon or coke with an aqueous acid or acids and then repeatedly evaporating after addition of hydrofluoric acid.

3. The process of claim 2, wherein the solvent treatment comprises extracting the activated carbon or coke 3–5 times with about 20% hydrochloric acid for a total of about 72 hours, and then evaporating to dryness about 3 times after addition of hydrofluoric acid.

4. A hard, mechanically stable, porous carbon support material useful in chromatography consisting essentially of highly purified activated carbon, highly purified coke, or a mixture thereof, said support material having a carbon content of at least 99%, a specific surface area of about 1 to about 5 $m^2/g$ a particle size of about 5 to about 50 $\mu$m and a graphitzed carbon surface.

5. The porous carbon support material of claim 1 having a carbon content of at least 99%, a specific surface area of about 1 to about 5 $m^2/g$ and a particle size of about 5 to about 50 $\mu$m.